United States Patent
Ross

(10) Patent No.: US 9,432,218 B2
(45) Date of Patent: *Aug. 30, 2016

(54) SECURE MESSAGE DELIVERY TO A TRANSIENT RECIPIENT IN A ROUTED NETWORK

(75) Inventor: Theodore L. Ross, Littleton, MA (US)

(73) Assignee: Red Hat, Inc., Raleigh, NC (US)

( * ) Notice: Subject to any disclaimer, the term of this patent is extended or adjusted under 35 U.S.C. 154(b) by 368 days.

This patent is subject to a terminal disclaimer.

(21) Appl. No.: 13/193,015

(22) Filed: Jul. 28, 2011

(65) Prior Publication Data

US 2013/0031186 A1    Jan. 31, 2013

(51) Int. Cl.
*G06F 15/16* (2006.01)
*H04L 12/64* (2006.01)

(52) U.S. Cl.
CPC ................. *H04L 12/6418* (2013.01)

(58) Field of Classification Search
CPC ........... H04L 12/6418; H04L 12/5815; H04L 12/5845; H04L 12/587
USPC ........................ 709/206, 230, 232
See application file for complete search history.

(56) References Cited

U.S. PATENT DOCUMENTS

| | | | |
|---|---|---|---|
| 6,161,006 A | 12/2000 | Balachandran | |
| 6,704,795 B1 | 3/2004 | Fernando et al. | |
| 7,181,441 B2 | 2/2007 | Mandato et al. | |
| 7,801,857 B2 | 9/2010 | Betts et al. | |
| 8,600,416 B2 | 12/2013 | Lin et al. | |
| 8,621,035 B2 | 12/2013 | Li et al. | |
| 9,021,131 B2 | 4/2015 | Ross | |
| 9,137,189 B2 | 9/2015 | Ross | |
| 2002/0143855 A1 | 10/2002 | Traversat et al. | |
| 2003/0115317 A1 | 6/2003 | Hickson et al. | |
| 2003/0189946 A1 | 10/2003 | Yajnik et al. | |
| 2004/0054802 A1* | 3/2004 | Beauchamp et al. | ......... 709/238 |
| 2004/0073672 A1* | 4/2004 | Fascenda | .............. H04W 12/08 709/225 |
| 2004/0205439 A1 | 10/2004 | Carmeli et al. | |
| 2004/0237153 A1 | 11/2004 | Eby | |
| 2004/0254993 A1 | 12/2004 | Mammas | |
| 2005/0021622 A1 | 1/2005 | Cullen | |
| 2005/0152286 A1 | 7/2005 | Betts et al. | |
| 2005/0272412 A1 | 12/2005 | Langsenkamp et al. | |
| 2006/0085507 A1 | 4/2006 | Zhao et al. | |

(Continued)

FOREIGN PATENT DOCUMENTS

EP    2144193 A1 *  1/2010  .......... G06Q 10/107
JP    2003044407 A  *  2/2003

OTHER PUBLICATIONS

AMPQ 1.0 Draft Recommendation, http://www.amqp.org/confluence/pages/viewpage.action?pageId=4489238.

(Continued)

*Primary Examiner* — Kostas Katsikis
(74) *Attorney, Agent, or Firm* — Lowenstein Sandler LLP

(57) ABSTRACT

Systems and methods are provided that route messages for a message consumer to a predicted future connection point of the consumer to a messaging network, while the consumer is not connected to the messaging network. In various embodiments, the network predicts or projects the future connection point based on the consumer's last connection, an itinerary or schedule for the consumer, the consumer's past connection behavior, and/or connection patterns of the consumer and/or a group of message consumers that are similar to the consumer.

20 Claims, 7 Drawing Sheets

(56) References Cited

U.S. PATENT DOCUMENTS

| | | | |
|---|---|---|---|
| 2006/0168037 A1* | 7/2006 | Audu et al. | 709/206 |
| 2007/0014302 A1 | 1/2007 | Vincent | |
| 2007/0083669 A1 | 4/2007 | Tsirtsis et al. | |
| 2007/0299947 A1* | 12/2007 | El-Damhougy | 709/223 |
| 2008/0229334 A1 | 9/2008 | Graham et al. | |
| 2009/0047948 A1* | 2/2009 | Turetsky et al. | 455/432.1 |
| 2009/0125231 A1* | 5/2009 | Ichimura | 701/207 |
| 2009/0240586 A1* | 9/2009 | Ramer et al. | 705/14 |
| 2010/0017867 A1* | 1/2010 | Fascenda | H04L 63/0823 726/9 |
| 2010/0191692 A1 | 7/2010 | Gassewitz et al. | |
| 2010/0217824 A1* | 8/2010 | Stiemerling et al. | 709/217 |
| 2010/0241717 A1 | 9/2010 | Hawkings et al. | |
| 2010/0318617 A1* | 12/2010 | Rault et al. | 709/206 |
| 2010/0333084 A1* | 12/2010 | Dehaan | G06F 8/61 717/176 |
| 2011/0066690 A1* | 3/2011 | Ellanti et al. | 709/206 |
| 2011/0125823 A1* | 5/2011 | Macken | G06F 9/542 709/201 |
| 2011/0125921 A1 | 5/2011 | Karenos et al. | |
| 2011/0145263 A1 | 6/2011 | Sakamoto et al. | |
| 2011/0265164 A1 | 10/2011 | Lucovsky | |
| 2011/0269476 A1* | 11/2011 | Kumar | 455/456.1 |
| 2011/0292804 A1 | 12/2011 | Dempo | |
| 2011/0302275 A1 | 12/2011 | Prodan et al. | |
| 2012/0072548 A1* | 3/2012 | Kim | 709/219 |
| 2012/0209517 A1* | 8/2012 | Li et al. | 701/445 |
| 2012/0246337 A1 | 9/2012 | Ross | |
| 2012/0246340 A1 | 9/2012 | Ross | |
| 2013/0031186 A1 | 1/2013 | Ross | |
| 2013/0066936 A1* | 3/2013 | Krishnan et al. | 709/201 |
| 2014/0003064 A1 | 1/2014 | Long | |

OTHER PUBLICATIONS

Theodore L. Ross, "Systems and Methods for Providing Distributed Dynamic Routing Using a Logical Broker", U.S. Appl. No. 13/071,243, filed Mar. 24, 2011.
Theodore L. Ross, "Systems and Methods for Routing Messages Exclusively to Eligible Consumers in a Dynamic Routing Network", U.S. Appl. No. 13/071,277, filed Mar. 24, 2011.
Theodore L. Ross, "Systems and Methods for Identifying Linked Message Brokers in a Dynamic Routing Network", U.S. Appl. No. 13/071,306, filed Mar. 24, 2011.
USPTO, Office Action for U.S. Appl. No. 13/071,277 mailed on May 22, 2013.
Office Action for U.S. Appl. No. 13/071,243 Sep. 3, 2014.
Office Action for U.S. Appl. No. 13/071,243 Jul. 21, 2014.
Office Action for U.S. Appl. No. 13/071,243 May 12, 2014.
Office Action for U.S. Appl. No. 13/071,243 Dec. 6, 2013.
Office Action for U.S. Appl. No. 13/071,243 Oct. 17, 2013.
Office Action for U.S. Appl. No. 13/071,243 Jul. 22, 2013.
Office Action for U.S. Appl. No. 13/071,243 Mar. 22, 2013.
Notice of Allowance for U.S. Appl. No. 13/071,306 Sep. 24, 2014.
Office Action for U.S. Appl. No. 13/071,306 Oct. 21, 2013.
Office Action for U.S. Appl. No. 13/071,306 Feb. 28, 2013.
Office Action for U.S. Appl. No. 13/071,306 May 21, 2014.
Office Action for U.S. Appl. No. 13/071,277 mailed Mar. 13, 2014.
Office Action for U.S. Appl. No. 13/071,277 mailed Jan. 7, 2014.
Office Action for U.S. Appl. No. 13/071,277 mailed Oct. 25, 2013.
Notice of Allowance for U.S. Appl. No. 13/071,306 Dec. 31, 2014.
Office Action for U.S. Appl. No. 13/071,277 mailed Apr. 23, 2015.
Office Action for U.S. Appl. No. 13/071,277 mailed Dec. 10, 2015.
Office Action for U.S. Appl. No. 13/071,277 mailed Aug. 20, 2014.
USPTO, Non-Final Office Action for U.S. Appl. No. 13/071,277 mailed Aug. 14, 2015.

* cited by examiner

SECURE MESSAGE DELIVERY TO A TRANSIENT RECIPIENT IN A ROUTED NETWORK

FIELD

The present invention relates to message routing generally, and more particularly relates to dynamically routing and quickly delivering messages to a recipient that changes connections to the routing network.

BACKGROUND

In conventional messaging systems, such as systems implementing queuing protocols like AMQP, the communication routes between brokers are statically defined at system setup, often based on the connections of message consumers or recipients who exist at the time that the network is first configured. Such systems typically forward all messages from message producers to all brokers in the network because a consumer for any particular message may potentially be connected to any broker in the network. The system, however, has no knowledge or tracking of whether or not a consumer for a particular message exists or is connected along any particular route.

As a consequence, conventional systems constantly forward messages to brokers that have no consumers connected to them, either directly or indirectly, and eventually those messages are discarded unconsumed. This results in inefficient and unnecessary use of system resources, such as communication bandwidth between brokers, as well as processing and storage resources on each individual broker that unnecessarily handles a message for which there is no downstream consumer.

A dynamically routed messaging network, for example as described in the U.S. patent application entitled "Systems and Methods for Identifying Linked Message Brokers in a Dynamic Routing Network," by Theodore Ross filed on Mar. 24, 2011, assigned application Ser. No. 13/071,306, (which is incorporated herein by reference in its entirety), addresses the above-mentioned drawbacks of conventional messaging systems by refraining from forwarding a message to nodes that do not have a consumer currently connected to them. A difficulty arises, however, regarding what to do with a message when there is no consumer currently connected to the dynamically routed messaging network that can consume the message. One solution is to simply discard such messages. This solution, however, leads to the undesirable result that a message consumer does not receive messages that were sent while the message consumer was not connected to the messaging network.

Accordingly, it is desirable to provide systems and methods that dynamically route messages according to the future availability of a message consumer at times when the message consumer is not connected to the messaging network. It is also desirable to provide systems and methods that make backlogged messages available to the consumer as quickly as possible once the consumer connects to the messaging network.

DESCRIPTION OF DRAWINGS

The accompanying drawings, which are incorporated in and constitute a part of this specification, illustrate several embodiments of the invention and together with the description, serve to explain the principles of the invention.

DESCRIPTION OF EMBODIMENTS

Figure 1:
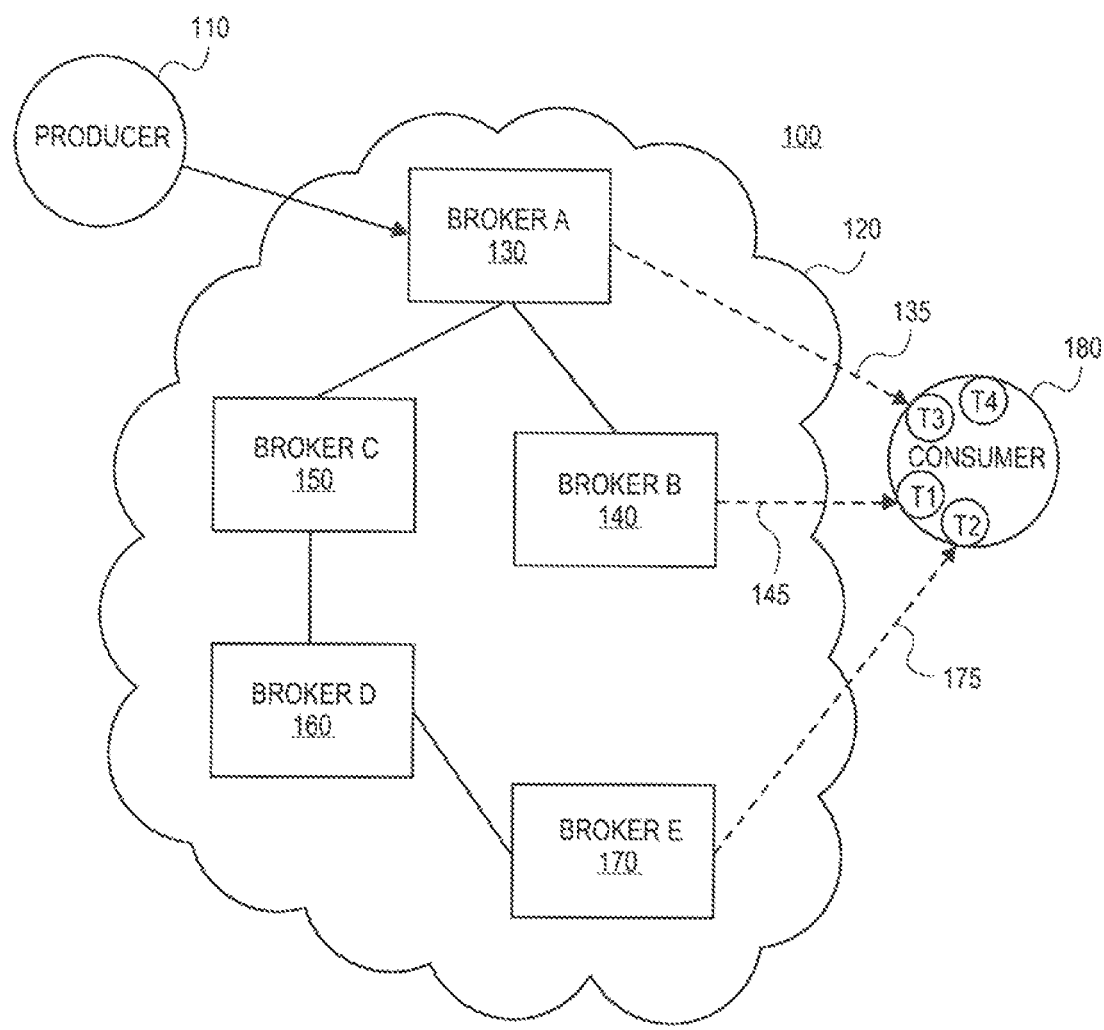
FIG. 1 illustrates an exemplary dynamically routed messaging system, consistent with embodiments of the invention.

Reference will now be made in detail to embodiments of the invention, examples of which are illustrated in the accompanying drawings. Wherever convenient, the same reference numbers will be used throughout the drawings to refer to the same or like parts.

Embodiments consistent with the present teachings relate to systems and methods for a dynamic messaging routing network that delivers messages to a consumer that is intermittently connected to the messaging network. Moreover, in exemplary embodiments wherein message consumers or recipients connect and disconnect from the dynamically routed messaging network at various times and places, systems and methods consistent with embodiments of the invention may anticipate, predict, or determine a likely future connection point for a message consumer, and forward messages for the consumer to that likely connection point while the consumer is not connected to the network and before the consumer next connects to the messaging network.

In various embodiments, systems, methods, and computer-readable media are provided for routing a message to a message consumer in a messaging network, which implement operations comprising receiving the message, wherein the message identifies a message consumer, determining that the message consumer is not currently connected to the messaging network, calculating a likely future point of connection to the messaging network for the message consumer; and sending the message to the likely future point of connection.

Various embodiments further include operations comprising accessing an itinerary of the message consumer, accessing a current date, determining a geographic location for the message consumer according to the itinerary and the current date, determining an identity of a point of connection that is associated with the geographic location, and setting the likely future point of connection to be the identity of the point of connection that is associated with the geographic location. Other embodiments further include accessing an itinerary of the message consumer, accessing a current date, determining a geographic location for the message consumer according to the itinerary and the current date, determining an identity of a point of connection that is associated with the geographic location, and setting the likely future point of connection to be the identity of the point of connection that is associated with the geographic location.

Still other embodiments include tracking a plurality of connection points of the message consumer, projecting a next connection point based on a pattern of the plurality of connection points, determining an identity of a point of connection that is associated with the next connection point that is projected, and setting the likely future point of connection to be the identity of the point of connection that is associated with the next connection point that is projected. In some instances, the pattern is a geographical location pattern.

Further embodiments provide systems, methods, and computer-readable media, which further include operations comprising tracking a plurality of connection points of a plurality of message consumers, projecting a next connection point for a message consumer among the plurality of message consumers based on a pattern of the plurality of connection points, determining an identity of a point of connection that is associated with the next connection point that is projected; and setting the likely future point of connection to be the identity of the point of connection that is associated with the next connection point that is projected.

Turning to the drawings, FIG. 1 illustrates an exemplary dynamically routed messaging system 100 consistent with embodiments of the invention. In the embodiment shown, a producer 110 of messages communicates with a consumer 180 of messages via a network 120. In some embodiments, producer 110 may be a data processing system, such a laptop or desk top computer, operated by a user, which sends a message. In other embodiments, producer 110 may be an application or software program running on a data processing system, which sends a message. Similarly, in some embodiments, consumer 180 may be a data processing system, such a laptop or desk top computer, operated by a user, which receives the message from producer 110. In other embodiments, consumer 180 may be an application or software program running on a data processing system, which receives the message from producer 110. No one specific implementation of producer 110 or consumer 180 is critical to the invention.

In the embodiment shown, network 120 is made up of a broker A 130, which communicates with a broker B 140 and a broker C 150, which communicates with a broker D 160, which communicates with a broker E 170. Network 120 may be a private, public, or mixed private and public network. In various embodiments, brokers 130, 140, 150, 160, and 170 may be data processing systems, such as server computers or other computing systems, which are communicatively linked to each other. No one specific implementation of brokers 130, 140, 150, 160, and 170 or connections among brokers, producers, and consumers is critical to the invention. In some embodiments, message transportation connections and communications among brokers, producers, and consumers may be implemented using a known messaging protocol, such as the advanced messaging queuing protocol (AMQP). The topology of the brokers in network 120 is not critical to the invention; for example, brokers 130, 140, 150, 160, and 170 may be connected in a string topology or a ring topology instead of the multi-branch tree topology shown.

As illustrated in FIG. 1, message producer 110 is connected to network 120 via broker A 130. As also illustrated, message consumer 180 may be connected to network 120 via different brokers at different times. For instance, as shown in FIG. 1, consumer 180 may be communicatively connected via connection 145 to broker B 140 at time T1, may be communicatively connected via connection 175 to broker E 170 at time T2, and communicatively connected via connection 135 to broker A 130 at time T3. This may correspond, for example, to a mobile user with a laptop computer (e.g., message recipient/consumer 180) logging onto and off of various local servers (e.g., broker B 140, broker E 170, and broker A 130) from different locations as the mobile user travels on a business trip. In some embodiments, message producer 110 may similarly connect to and disconnect from various brokers in network 120 at various times.

Embodiments consistent with the invention dynamically route messages from producer 110 to consumer 180 according to either the current location where consumer 180 is connected to network 120, or a predicted location where consumer 180 is anticipated to connect to network 120 at a future time.

Consider first some examples where producer 110 produces a message for consumer 180 while consumer 180 is connected to network 120. For example, at time T1, producer 110 may post a message that is bound solely for consumer 180 to broker A 130, which routes the message to broker B 140, where consumer 180 consumes the message via connection 145. In the time T1 example, broker A 130 does not route the message to broker C 150 because at time T1 there is no path to consumer 180 through broker C 150.

At later time T2, producer 110 may transmit a message bound solely for consumer 180 to broker A 130, which routes the message to broker C 150, which routes the message to broker D 160, which routes the message to broker E 170, where consumer 180 consumes the message via connection 175. In the time T2 example, broker A 130 does not route the message to broker B 140 because at time T2 there is no path to consumer 180 through broker B 140 (although a path via broker B 140 did exist earlier at time T1).

At later time T3, a message bound solely for consumer 180 from producer 110 is published to broker A 130, which provides the message directly to consumer 180. In the time T3 example, broker A 130 does not route the message to broker B 140 or to broker C 150 because at time T3 there is no path to consumer 180 through broker B 140 or broker C 150 (although paths via broker B 140 and broker C 150 did exist earlier at times T1 and T2). In the embodiment shown, the message routing performed by network 120 is dynamic because the routes change according to changes in the connection location of consumer 180 at various times. Similarly, a change in the connection location of message producer 110 will change the routing.

At later time T4, when consumer 180 is not connected to network 120, producer 110 may transmit a message bound solely for consumer 180 to broker A 130. In a conventional messaging system, because there are no paths that lead to consumer 180 at time T4, broker A 130 typically does not route the message to broker B 140 or broker C 150. Often, a messaging system will discard unread such a message bound for consumer 180. For example, broker A 130 may discard the message due to the lack of a connection that leads to consumer 180 at time T4, or broker A 130 may forward copies of the message to the brokers throughout network 120, which will each discard the message upon determining that they are not currently connected to consumer 180 and cannot forward the message to another broker in network 120 that has not yet received the message. In some situations, a conventional messaging system may hold the message for a predetermined period of time at the broker that received it from the message producer. If the predetermined period expires before the message consumer connects to the receiving/holding broker, then the message is discarded unread. If the message consumer connects to a broker other than the receiving broker, then the message may be discarded unread, or there may be an attempt to forward it to the broker to which the consumer is currently connected. If the forwarded message does not reach the broker to which the consumer is connected before the consumer disconnects, then it is typically discarded. At best in this situation, the message is undesirably delayed in reaching the consumer, as it must traverse the network to the broker to which the consumer is currently connected.

In contrast, embodiments consistent with the principles of the invention create a prediction regarding the next broker of network 120 to which consumer 180 will connect after time T4, and forward the time T4 message to the predicted broker, which stores it. For example, if the system predicts that consumer 180 will next connect to network 120 at broker B 140, then at time T4, broker A 130 routes the message to broker B 140, which stores the message until consumer 180 connects to network 120 again.

In various embodiments, when message consumer 180 again connects to a broker in network 120, information about that connection is automatically propagated to the other brokers in dynamically routed network 120, as described, for example in the U.S. patent application entitled "Systems and Methods for Identifying Linked Message Brokers in a Dynamic Routing Network," by Theodore Ross filed on Mar. 24, 2011 assigned application Ser. No. 13/071,306 (incorporated by reference). A dynamically routed network, such as network 120, knows where consumer 180 is currently connected, and brokers 130-170 route any messages for consumer 180 to the broker that consumer 180 is currently connected to. Thus, if consumer 180 later connects to broker B 140 as predicted, then broker B 140 will make the stored message immediately available to consumer 180. If, on the other hand, consumer 180 later connects to a broker other than broker B 180, then broker B 180 will learn that consumer 180 is again connected to network 120 through propagation of the connection information throughout the network 120. Upon learning where consumer 180 is connected to network 120, broker B 180 will forward the stored message along an appropriate route to reach consumer 180's current connection broker.

One of ordinary skill will recognize that the topology, producer connections, consumer connections, and other details of messaging system 100 are exemplary and presented in the form shown for conciseness and ease of illustration. Other components, topologies, connections, etc. may be substituted for those shown without departing from the scope of the invention. In addition, one of ordinary skill will recognize that for implementations with two-way communications, consumer 180 may also be a producer of messages bound for producer 110, and producer 110 may also be a consumer of messages from consumer 180.

Figure 2:
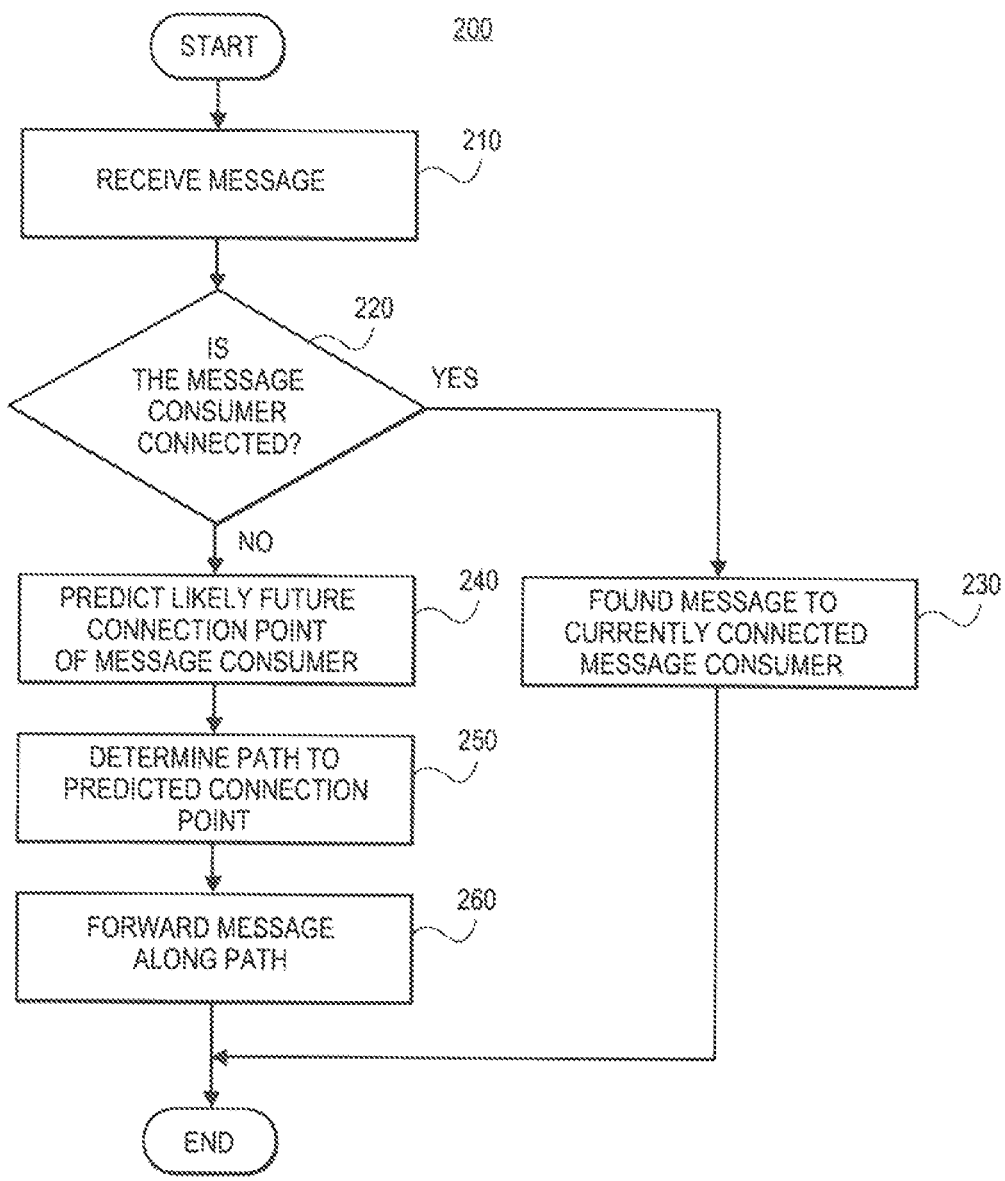
FIG. 2 is a flowchart showing an exemplary process for delivering messages to a message consumer that is intermittently connected to a dynamically routed messaging network, consistent with embodiments of the invention.

FIG. 2 is a flowchart showing an exemplary process 200 for delivering messages to a message consumer that is intermittently connected to a dynamically routed messaging network, consistent with embodiments of the invention. In various embodiments, process 200 may be implemented by a server computer, or other data processing system, functioning as a broker, such as brokers 130, 140, 150, 160, or 170 of FIG. 1. As shown in FIG. 2, process 200 begins with receiving a message, such as when broker A 130 receives a message published by producer 110 (stage 210). In various embodiments, the message may include information indicating that the message is meant to be delivered to a specific recipient, such as message consumer 180.

Process 200 continues at stage 220 by determining whether an appropriate message consumer (or the appropriate message consumer, if the message is addressed to a single recipient) is currently connected to the dynamically routed messaging network. For an example with respect to FIG. 1, broker A 130 may determine whether consumer 180 is currently connected to network 120 when broker A 130 receives a message from producer 110. In a dynamically routed messaging network, all of the brokers in the network are aware of the message consumers that are currently connected to the network, and all of the brokers are kept up-to-date as message consumers connect and disconnect from the network. Descriptions of methods, devices, and software that may be used to implement a dynamically routed messaging network are contained in U.S. patent application Ser. No. 13/071,243 entitled "Systems and Methods for Providing Distributed Dynamic Routing Using a Logical Broker," by Theodore Ross filed on Mar. 24, 2011, (which is hereby incorporated by reference in its entirety), and U.S. patent application Ser. No. 13/071,277 entitled "Systems and Methods for Routing Messages Exclusively to Eligible Consumers in a Dynamic Routing Network," by Theodore Ross filed on Mar. 24, 2011 , (which is hereby incorporated by reference in its entirety), as well as the aforementioned U.S. application Ser. No. 13/071,306.

If the message consumer is currently connected to the network (stage 220, Yes), then process 200 proceeds to stage 230 and forwards the message to the currently connected message consumer, as described in the previously incorporated-by-reference applications. Examples of stage 230 are also described above with respect to FIG. 1 at times T1, T2, and T3.

If, on the other hand, the message consumer is not currently connected to the network (stage 220, No), then process 200 proceeds to stage 240. At stage 240, the process predicts a likely future connection point or points where the message consumer is anticipated to connect to the dynamic messaging network at a later time. In various embodiments, the future connection point may be a broker or other computing device that is part of the dynamic messaging network.

In various embodiments, process 200 may determine or calculate a likely future connection point for a specific message consumer based on information provided by, or gathered regarding, that message consumer. For example, process 200 may receive from a message consumer a schedule, itinerary, calendar, or other information specifying when and where the message consumer will be located in the future, including perhaps specific dates, times, and message brokers (or geographic locations) that the message consumer will use to connect to the network. For another example, process 200 may monitor over a period of time the dates, times, and message brokers used by a certain message consumer to connect to the network, and store the monitored information for analysis and prediction or projection of the message consumer's future behavior based on past behavior. In yet another example, process 200 may monitor and record the connection behavior of groups of similar message consumers, or of all message consumers, and use group patterns to predict a likely future connection point for a specific message consumer that is in the group or that correlates to the group. Other ways of predicting a likely future connection point(s) for a message consumer may also be used.

Moreover, in some embodiments, if more than one future connection point may be considered likely, then stage 240 may produce more than one likely future connection point as output. In some embodiments, process 200 may employ a design choice wherein stage 240 routinely calculates two or more likely connection points, for example, in order of likelihood, and forwards the message to the two or more likely connection points. In other embodiments, process 200 may employ a design choice wherein if stage 240 calculates two or more likely connection points, then stage 240 outputs a broker between those two points as a "psuedo" likely connection point, so that the message need travel only a short distance if the consumer eventually connects to one of the calculated likely connection points. For example with reference to FIG. 1, if stage 240 calculates broker C 150 and broker E 170 as likely future connection points (perhaps equally likely), then stage 240 may output broker D 160 as a psuedo" likely connection point, because it is between the two actual likely future connection points. In this example, if the consumer logs onto either broker C 150 or broker E 170, then broker D 160 can route the message over a single hop to reach either of these brokers.

For an example related to stage 240 with respect to FIG. 1, consider an embodiment where process 200 receives a predetermined itinerary for consumer 180. In this example, broker A may have a copy of the predetermined itinerary and receive a message for consumer 180 at a time after T1 and before T2 during which consumer 180 is not currently connected to network 120. Using the itinerary, process 200 determines that consumer 180 is likely to connect to broker E 170 because time T2 is the next time that will occur, and consumer 180 is scheduled to be near the geographic location of, or otherwise scheduled to connect to, broker E 170 at time T2, based on the itinerary. In this example, stage 240 would predict that the likely future connection point of consumer 180 is broker E 170, in accordance with the information on the predetermined itinerary for consumer 180.

Referring again to FIG. 2, process 200 continues at stage 250 by determining a path through the dynamically routed network that leads to the likely future connection point (or points) determined in stage 240. In some embodiments, this may be done using a network topology map, a copy of which may be stored at each node (e.g., broker) of the messaging network. In other embodiments, a node (e.g., broker) implementing process 200 may dynamically discover the network topology by sending out discovery commands that propagate through the network and cause nodes to report back in response, as is well-known to those of skill in the messaging network arts. Other techniques for obtaining the network topology may also be used.

Continuing again with the previous example with respect to FIG. 1, broker A 130 may determine a path to the predicted likely future connection point, which is broker E 170. In this case, as illustrated in FIG. 1, the path is broker A 130 to broker C 150 to broker D 160 to broker E 170. In this example there is a single path to the likely future connection point, broker E 170. In other network topologies, there may be multiple paths to a likely future connection point, and the system may choose a path among the multiple paths based on criteria such the shortest path, the fastest path, etc. as is known in the art.

Referring again to FIG. 2, process 200 next forwards the message along the determined path to the likely future connection point (stage 260). In some embodiments, a holding queue or other storage point may be set up on the broker that is the likely future connection point, simulating having the message consumer currently connected to the broker. Information about the holding queue/simulated connection may be propagated throughout the dynamically routed messaging network so that the brokers along the path (as well as other brokers in the network) know where to forward messages bound for that consumer, as described in the previously incorporated-by-reference applications.

In various embodiments, when the message is received by the likely future connection point (e.g., a broker), it is stored there, for example in a holding queue, until the message consumer again connects to the messaging network, at which time it is delivered to the message consumer. Ideally, when the message consumer again connects to the messaging network, it will be at the predicted connection point, and the stored message will be delivered to the message consumer very quickly without having to pass through intermediary nodes. For example, in an AMQP-based implementation of a messaging network, the message consumer may subscribe to the holding queue when connecting, and then retrieve messages stored there. Regardless of where the message consumer connects, however, the message will be delivered to the message consumer when the message consumer again connects to the network, because the dynamically routed network will propagate information regarding the message consumer's current connection point throughout the network, and messages addressed to the consumer will be routed to the consumer, as described in the previously mentioned incorporated-by-reference applications.

In some embodiments, process 200 may be executed by each broker in a messaging network, so that any broker that receives a message for a consumer that is not currently connected will forward the message to a likely future connection point. For instance, continuing the example from the previous paragraph with respect to FIG. 1, after determining the path to the predicted connection point (broker E 170) and setting up a holding queue at the predicted connection point (broker E 170), broker A 130 forwards the message to broker C 150, which forwards the message to broker D 160, which forwards the message to broker E 170, which places the message in the holding queue. When consumer 180 connects to broker E 170 at time T2, the message will be waiting.

In some embodiments, the prediction algorithm may not execute upon receipt of a message that is being sent to a non-attached destination, e.g., a non-connected consumer. In such embodiments, the prediction algorithm may execute when the destination (e.g., consumer) disconnects from the network. Thus, in an example for such embodiments, when consumer 180 disconnects from network 120, a broker(s) in network 120 makes a heuristic prediction as to where consumer 180 might reappear (i.e., reconnect) and establishes a holding queue for consumer 180 near that reconnection location. This has at least two desirable effects: messages already enqueued and waiting for delivery to consumer 180 at disconnect time are immediately re-staged to the holding queue near where consumer 180 is expected to reconnect; and new messages destined for consumer 180 are routed in advance to a location near where consumer 180 is expected to next reconnect.

One of ordinary skill will recognize that stages may be added to, deleted from, or modified within process 200 without departing from the principles of the invention. For example, additional process stages may be added to set up a holding queue at the likely future connection point. For another example, stages may be modified to predict more than one likely future connection point, determine paths to each, and forward the message to each.

FIGS. 3A-3D are flowcharts showing exemplary processes for predicting a likely future connection point of a message consumer, consistent with embodiments of the invention. In various embodiments, one or more of the exemplary processes shown in FIGS. 3A-3D may be used to implement stage 240 of process 200, which is shown in FIG. 2. In various embodiments, one or more of the exemplary processes shown in FIGS. 3A-3D may be implemented by a server computer, or other data processing system, functioning as a broker, such as brokers 130, 140, 150, 160, or 170 of FIG. 1.

Figure 3A:
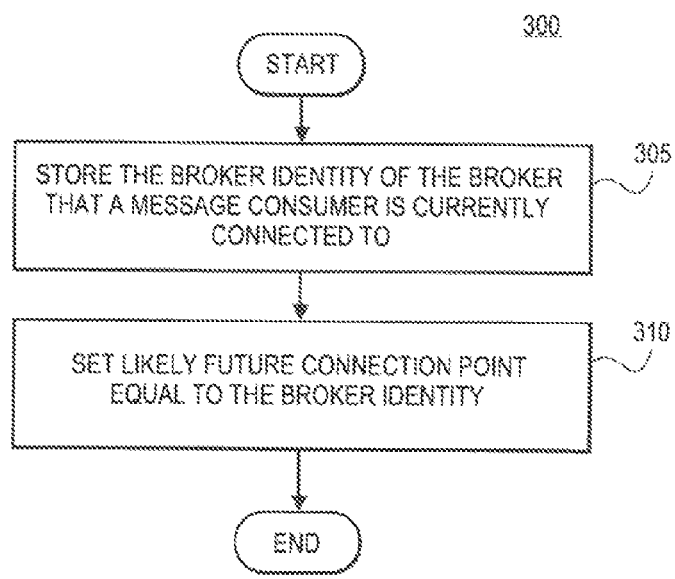
FIGS. 3A-3D are flowcharts showing exemplary processes for predicting a likely future connection point of a message consumer, consistent with embodiments of the invention.
Figure 3B:
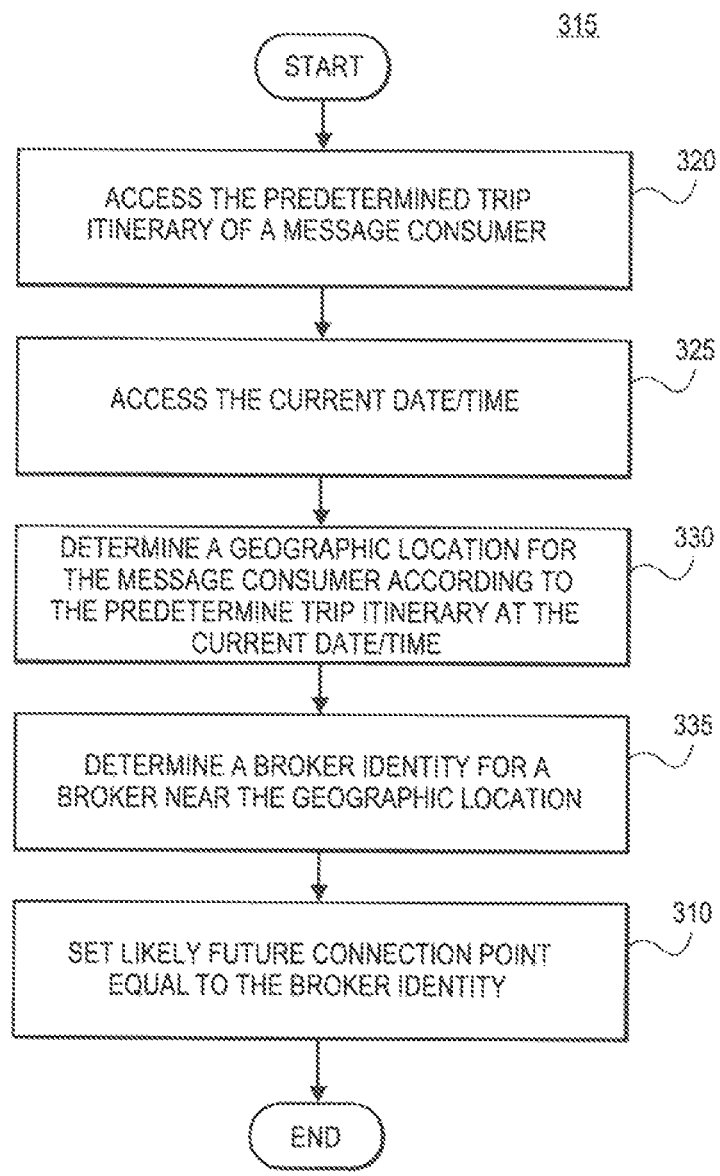

As shown in FIG. 3A, process 300 for predicting a likely future connection point of a message consumer begins by storing the identity of the broker to which a message consumer is currently connected (stage 305). For example with reference to FIG. 1, if process 300 is implemented at time T1, then stage 305 would store information identifying broker broker B 140 as the broker identity associated with consumer 180.

At stage 320, process 300 sets the likely future connection point associated with a message consumer to be the broker identity stored in stage 305. In one regard, process 300 is predicting that the message consumer will connect in the future to the same broker that the message consumer is currently connected to. With respect to the example shown in FIG. 1, this will turn out to be an inaccurate prediction, because following disconnection after time T1, message consumer 180 will connect via broker E 170 at time T2, not via broker B 140 as predicted by process 300.

One of ordinary skill will recognize that stages may be added to, deleted from, or modified within process 300 without departing from the principles of the invention. For example, additional processing stages may be added to store the identities of the current and previous brokers to which the message consumer is/was connected, and set two likely future connection points equal to those two identities.

FIG. 38 depicts an exemplary process 315 for predicting a likely future connection point of a message consumer based on a predetermined itinerary; schedule, or calendar for the consumer. Process 315 begins by accessing a predetermined itinerary, such as a trip itinerary, for the message consumer (stage 320). In various embodiments, the predetermined itinerary includes information specifying when and where the message consumer will be located in the future, including perhaps specific dates, times, and message brokers (or geographic locations) that the message consumer will use to connect to the network. In some embodiments, the predetermined itinerary may be provided to process 315 by the message consumer, for example in the form of a file, such as a word processing file, or a spreadsheet file. In other embodiments, the predetermined itinerary may be retrieved by or provided to process 315 from a software application or program, such as a calendar program (e.g., a MicroSoft Outlook® calendar program) or a workflow program, a scheduling program, or a travel planning program, such as is provided by Expedia.com™, Priceline.com™, and similar travel services.

Next, process 315 accesses the current date and time (stage 325). For example, process 315 may read the clock of a server or other computing system implementing process 315 to determine the current date and time.

Process 315 then determines a geographic location for the message consumer according to the predetermined itinerary and the current date and time (stage 330). For example, consider the case where the current date and time is Mar. 1, 2011 and 9:00 pm, and a predetermined trip itinerary indicates that the message consumer will depart by plane from Washington D.C. On Mar. 2, 2011 at 7:43 am and arrive by plane in Cincinnati, Ohio on Mar. 2, 2011 at 8:54 am. Based on this information, process 315 may determine the geographic location to be Cincinnati, Ohio. In this example, process 315 determines that the future location (Cincinnati, Ohio), is more likely to be the next place from which the consumer connects than the current location (Washington, D.C.), because of the current time (9:00 pm—after business hours, consumer unlikely to log in before departing) and the flight schedules (early morning flight, consumer unlikely to log in before departing). Other techniques for determining a geographic location for the message consumer may also be used.

At stage 335, process 315 determines a broker identity for a broker near, or otherwise associated with, the geographic location determined in stage 330. In various embodiments, process 315 determine a broker(s) near the consumer's anticipated geographic location using network topology information indicating the geographic location of each server or other computing system that implements each broker in a messaging network. In various embodiments, process 335 may also utilize network connection rules and protocols in determining a broker(s) near the consumer's anticipated location. For example, for geographic locations where there is a regional office of an organization that the message consumer belongs to, process 315 may determine that the consumer will likely connect via the LAN in that regional office, and consult the network connection rules and protocols to determine which server/broker of the messaging network services the LAN. For another example, for geographic locations where process 315 determines that the consumer will likely connect via the Internet (e.g., locations where there is no regional office or other resource that would enable a non-public network connection), process 315 may consult the network connection rules and protocols to determine which server/broker of the messaging network services Internet connections from the message consumer's anticipated geographic location. Other techniques for determining a broker identity for a broker associated with the geographic location may also be used.

At stage 310, process 315 sets the likely future connection point associated with a message consumer to be the broker identity determined in stage 335. In one regard, process 315 is predicting that the message consumer will connect in the future to a broker associated with either the current location or the next location on the consumer's itinerary, according to the current date and time and the consumer's expected movement according to the itinerary.

One of ordinary skill will recognize that stages may be added to, deleted from, or modified within process 315 without departing from the principles of the invention. For example, additional processing stages may be added to periodically check a user's itinerary information to detect changes, such as canceled, delayed or missed flights, and recalculate the likely future connection point as needed.

Figure 3C:
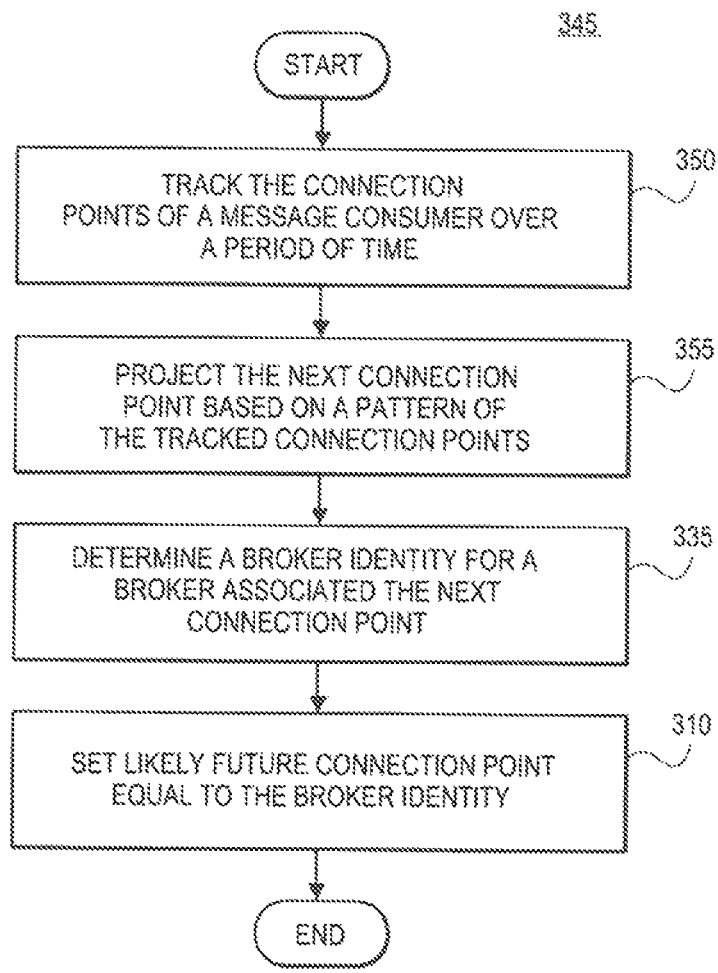

FIG. 3C depicts an exemplary process 345 for predicting a likely future connection point of a message consumer based on the past behavior of the message consumer. Process 315 begins by tracking the connection points of a message consumer over a period of time (stage 350). In various embodiments, other information associated with each connection by the consumer may also be tracked and stored, such as the date and time of the connection, duration of the connection, mode of connection (via public or private network) etc. For example, process 345 may record the identities of the brokers to which the message consumer has connected during the past 60 days, or other time period, and the dates and times of each of those connections.

Next, process 345 projects the next connection point for the message consumer based on a pattern in the tracked connection points and other tracked information (stage 355). In some embodiments, a pattern(s) may be detected because connection points and times repeat. For example, a message consumer may connect to the messaging network via an office LAN from the consumer's customary work location on week days, and the tracking data gathered by process 345 would show connections via a first broker that is reached through the LAN on week days. On weekends, however, the consumer may connect to the messaging network via the Internet from home, and the tracking data would show connections via a second broker that is reached through the Internet on week days. In this example, stage 355 may project that the next likely future connection point will be the first broker if the next anticipated connection time (e.g., the next day) is a week day, or similarly may project that the next connection point will be the second broker if the next anticipated connection time (e.g., the next day) is a Saturday or Sunday.

In other embodiments, a pattern(s) may be detected because connection points are following a geographic pattern caused by the consumer traveling from one location to another, such as on a sales route. For example, a message consumer may connect periodically to the messaging network via a series of brokers that are geographically located from East to West of each other, and the tracking data may reflect that each time the consumer disconnects from the network for more than 24 hours, the next connection is to a broker that is geographically located to the West of the previous broker. In this example, stage 355 may project that the next likely future connection point will be the broker most recently connected to if less than 24 hours have passed since the previous connection, or will be the broker geographically to the West of the broker used in the previous connection, if more than 24 hours have passed since the previous connection. In still other embodiments, other patterns, and other techniques for projecting the next connection point for a message consumer, may also be used.

At stage 335, process 345 determines a broker identity for a broker near, or otherwise associated with, the connection point projected in stage 355. In various embodiments, process 345 may determine a broker identity for a broker associated with the projected connection point using techniques described with respect to stage 335 of process 315 in FIG. 3B. Other techniques may also be used.

At stage 310, process 345 sets the likely future connection point associated with a message consumer to be the broker identity determined in stage 335. In one regard, process 345 is predicting that the message consumer will connect in the future to a broker along a projected geographic travel route, according to the current date and time and the consumer's expected movement along the projected geographic route, based at least in part on the consumer's previous geographic movement.

One of ordinary skill will recognize that stages may be added to, deleted from, or modified within process 345 without departing from the principles of the invention. For example, stages may be added to track the quantity of connections at each connection point used by the message consumer, and then project the next connection point based on the recorded quantities, such as projecting that the likely future connection point will be the connection point with the largest quantity of previous connections. For another example, stage 355 may be modified to recognize connection trend pattern(s) in the tracking data, and project the next connection point based on a trend(s). For instance, the tracking data may reflect that a growing percentage of a user's most recent connections are via a specific broker, and based on this trend, stage 355 may project the next connection point to be that specific broker.

Figure 3D:
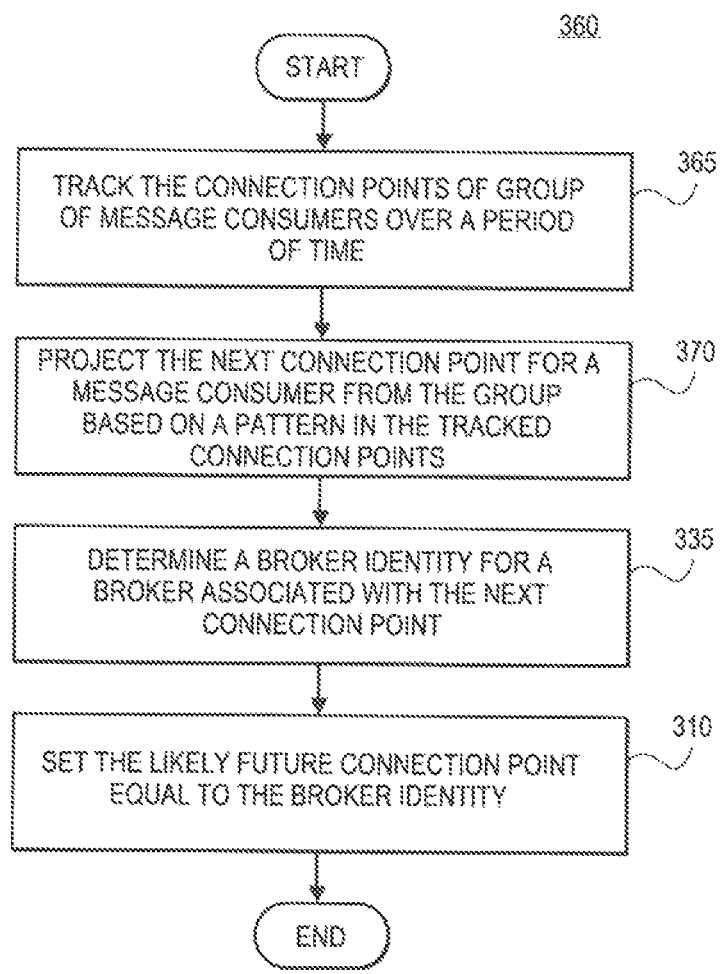

FIG. 3D depicts an exemplary process 360 for predicting a likely future connection point of a message consumer based on the behavior of a group of message consumers. Process 360 begins by tracking the connection points of a group of message consumers over a period of time (stage 365). In various embodiments, other information associated with the connection by the consumers may also be tracked and stored, such as the date and time of the connection, duration of the connection, method of connection (via public or private network) etc. For example, process 345 may record the identities of the brokers to which each message consumer in the group has connected during the past 60 days, or other time period, and the dates and times of each of those connections.

Next, process 360 projects the next connection point for a message consumer that belongs to, or has similar characteristics to, the tracked group based on a pattern in the tracked connection points and other tracked information (stage 370). In some embodiments, a pattern(s) may be detected because connection points and times repeat. For example, a group of message consumer may predominantly connect to the messaging network via an office LAN from work on week days, and the tracking data gathered by process 360 would show those connections via a first broker that is reached through the LAN on week days. On weekends, however, a large majority of the group of message consumers may connect to the messaging network via the Internet from home, and the tracking data would show those connections via a second broker that is reached through the Internet on week days. In this example, stage 370 may project that the next likely future connection point for a particular consumer in the group will be the first broker if the next anticipated connection time (e.g., the next day) is a week day, or similarly may project that the next connection point will be the second broker if the next anticipated connection time (e.g., the next day) is a Saturday or Sunday.

At stage 335, process 360 determines a broker identity for a broker near, or otherwise associated with, the connection point projected in stage 370. In various embodiments, process 360 may determine a broker identity for a broker associated with the projected connection point using techniques described with respect to stage 335 of process 315 in FIG. 3B. Other techniques may also be used.

At stage 310, process 360 sets the likely future connection point associated with a message consumer to be the broker identity determined in stage 335. In one regard, process 360 is predicting that a specific message consumer will connect in the future in the same way as the other consumers in the group, as gleaned from analyzing the tracked connections of all of the consumers in the group to detect group patterns for connecting to the'messaging network.

One of ordinary skill will recognize that stages may be added to, deleted from, or modified within process 360 without departing from the principles of the invention. For example, stages may be added to create the group that will be used for detecting patterns of connections. In one such embodiments, process 360 may receive a set of attributes that describe the message consumer of interest, and then identify other message consumers having the same or similar attributes, and form the identified message consumers into the group.

Figure 4:
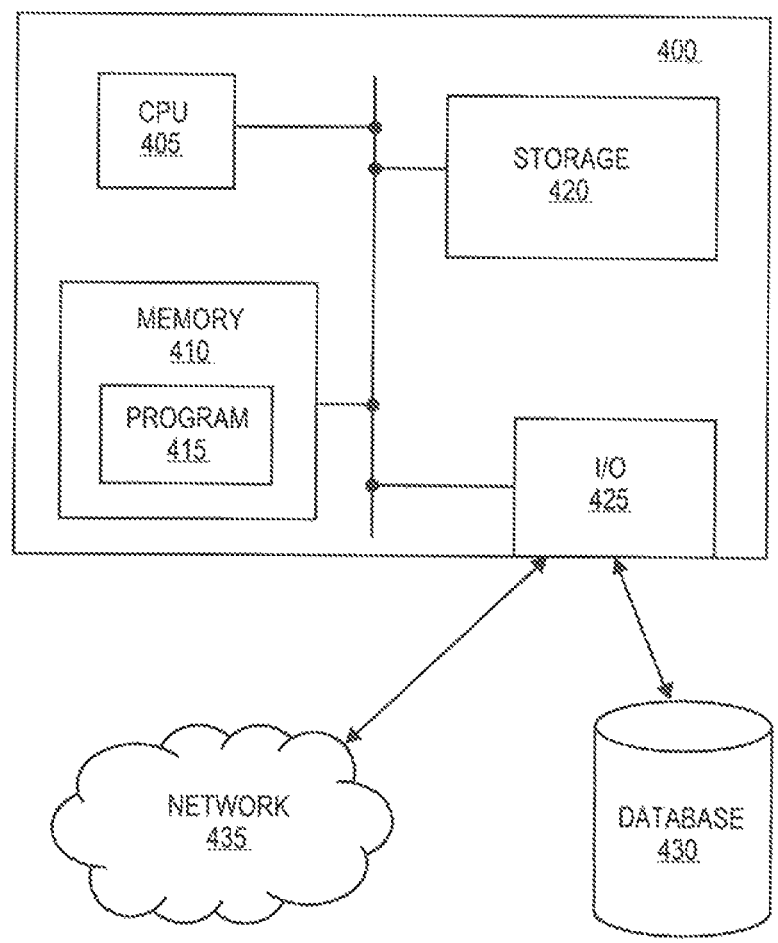
FIG. 4 is a block diagram of an exemplary data processing system that may be used to implement embodiments consistent with the invention.

FIG. 4 is a block diagram of an exemplary computing system or data processing system 400 that may be used to implement embodiments consistent with the invention, such as for example, embodiments of brokers, dynamic routing network managers, consumers and/or producers. The exact components and arrangement, however, are critical to the invention. Computing system 400 includes a number of components, such as a central processing unit (CPU) 405, a memory 410, an input/output (I/O) device(s) 425, and a nonvolatile storage device 420. System 400 can be implemented in various ways. For example, an implementation as an integrated platform (such as a workstation, personal computer, laptop, etc.) may comprise CPU 405, memory 410, nonvolatile storage 420, and I/O devices 425. In such a configuration, components 405, 410, 420, and 425 may connect and communicate through a local data bus and may access a database 480 (implemented, for example, as a separate database system) via an external I/O connection. I/O component(s) 425 may connect to external devices through a direct communication link (e.g., a hardwired or local wifi connection), through a network, such as a local area network (LAN) or a wide area network (WAN) and/or through other suitable connections. System 400 may be standalone or it may be a subsystem of a larger system.

CPU 405 may be one or more known processors or processing devices, such as a microprocessor from the Core™ 2 family manufactured by Intel™ Corporation or the Athlon™ family manufactured by AMD™ corporation, as well as processors and processing devices yet to be developed. Memory 410 may be one or more fast storage devices configured to store instructions and information used by CPU 405 to perform certain functions and processes related to embodiments of the present invention. Storage 420 may be a volatile or non-volatile, magnetic, semiconductor, tape, optical, or other type of storage device or computer-readable medium, including devices meant for long-term storage.

In the illustrated embodiment, memory 410 contains one or more programs or subprograms 415 loaded from storage 420 that, when executed by CPU 405, perform various procedures, processes, or methods consistent with the present invention. Alternatively, CPU 405 may execute one or more programs located remotely from system 400. For example, system 400 may access one or more remote programs via a network 435 that, when executed, perform functions and processes related to or implementing embodiments of the present invention.

In one embodiment, memory 410 may include a computer application or program 415 that implements process 200 and/or a computer application program 415 that implements processes 300, 315, 345, 360, and/or 200. Memory 410 may also include other programs or applications that implement other methods and processes that provide ancillary functionality for a broker, consumer, or producer.

Methods and systems consistent with the invention are not limited to programs or computers configured to perform dedicated tasks. For example, memory 410 may be configured with a program 415 that performs several functions when executed by CPU 405. For example, memory 410 may include a single program 415 that implements both processes 200 and 345 and the functionality of a dynamic routing manager, as described in the incorporated-by-reference applications.

Memory 410 may be also be configured with other programs (not shown) unrelated to the invention and/or an operating system (not shown) that performs several functions well known in the art when executed by CPU 405. By way of example, the operating system may be Microsoft Windows™, Unix™ Linux an Apple Computers™ operating system, Personal Digital Assistant operating system such as Microsoft CE™, or other operating system. The choice of operating system, and even to the use of an operating system, is not critical to the invention.

I/O device(s) 425 may comprise one or more input/output devices that allow data to be received and/or transmitted by system 400. For example, I/O device 425 may include one or more input devices, such as a keyboard, touch screen, mouse, and the like, that enable data to be input from a user, such as a system operator. Further, I/O device 425 may include one or more output devices, such as a display screen, CRT monitor, LCD monitor, plasma display, printer, speaker devices, and the like, that enable data to be output or presented to a user. I/O device 425 may also include one or more digital and/or analog communication input/output devices that allow computing system 400 to communicate, preferably digitally, with other machines, computing systems and devices. The configuration and number of input and/or output devices incorporated in I/O device 425 are not critical to the invention.

In the embodiment shown, system 400 is connected to a network 435 (e.g., the Internet or a private network), which may in turn be connected to various systems and computing machines (not shown), such as computers that are brokers, consumers, or producers, and which form a dynamically routed messaging network, such as network 120. In general, system 400 may input data from external machines and devices and output data to external machines and devices via network 435.

In the exemplary embodiment shown in FIG. 4, database 430 is a standalone database external to system 400. In other embodiments, database 430 may be hosted by system 400. In various'embodiments, database 430 may manage and store data used to implement systems and methods consistent with the invention. For example, database 430 may manage and store data structures that contain broker identity and location information, current connection information for each connected message consumer, likely future connection information for each message consumer, itinerary or schedule information for a consumer, geographic/map information, tracked connection information for a consumer and/or a group of consumers, subscription information, routing information, link information, network topology information, and the like.

Database 430 may comprise one or more databases that store information and are accessed and/or managed through system 400. By way of example, database 430 may be an Oracle™ database, a Sybase™ database, or other relational database. Systems and methods consistent with the invention, however, are not limited to separate data structures or databases, or even to the use of a database or data structure.

As described in various examples above, embodiments consistent with the invention relate to systems, methods, and media for secure message delivery to a message consumer (e.g., message recipient) having a transient network connection point in a dynamically routed network. In some embodiments, implementation may be effected on an AMQP-based message delivery network that can delivery messages through a sequence of dynamically-linked message brokers, whose links are configured using a series of message queues for local delivery to subscribers and also to neighboring broker nodes. In using the network, message consumers may connect and disconnect from the dynamically routed network at various times and places. The system may track the connection points of a message consumer(s), and determine a likely next connection point for a specific message consumer. The system may monitor and record a message consumer's connection history and analyze the history to identify, predict, or project a likely connection node (e.g., broker) for a future connection by the consumer. Once identified, the system may route any message received while the consumer is not connected to the predicted likely connection node (e.g., broker), where it will be held for delivery when the consumer next connects to the network.

The foregoing description is illustrative, and variations in configuration, implementation, and embodiment of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A method comprising:
receiving a message associated with a group comprising a plurality of message consumers, wherein the message identifies a message consumer among the plurality of message consumers in the group subscribed to a holding queue at a time in which the message consumer among the plurality of message consumers in the group is connected to a messaging network;
determining, by a processor, that the message consumer among the plurality of message consumers in the group is disconnected from the messaging network at a first time;
calculating, by the processor, a likely future point of connection to the messaging network at a second time for the message consumer among the plurality of message consumers in the group that is disconnected from the messaging network at the first time in view of a pattern of a plurality of points of connections of each of the plurality of message consumers associated with tracking information, wherein the second time occurs after the first time;
establishing, by the processor, the holding queue proximal to the likely future point of connection, wherein the message is placed on the holding queue; and
sending, by the processor, the message directly to the likely future point of connection before the message consumer reconnects to the messaging network at the second time.

2. The method of claim 1, wherein calculating the likely future point of connection comprises:
accessing an identity of a point of connection among the plurality of points of connections to which the message consumer was previously connected; and
setting the likely future point of connection to be the identity of the point of connection to which the message consumer was previously connected.

3. The method of claim 1, wherein calculating the likely future point of connection comprises:
accessing an itinerary of the message consumer;
accessing a current date;
determining a geographic location for the message consumer according to the itinerary and the current date;
determining an identity of a point of connection among the plurality of points of connections that is associated with the geographic location; and
setting the likely future point of connection to be the identity of the point of connection that is associated with the geographic location.

4. The method of claim 1 further comprising tracking data associated with each of the plurality of message consumers in the group, wherein the data comprise one of a date of point of connection to the messaging network, a time of the point of connection to the messaging network, a duration of the connection to the messaging network or a mechanism for connection to the messaging network.

5. The method of claim 1, wherein the pattern is a geographical location pattern.

6. The method of claim 1, wherein calculating the likely future point of connection comprises:
tracking the plurality of points of connection of each of the plurality of message consumers;
projecting a next connection point for a message consumer among the plurality of message consumers in view of the pattern of the plurality of points of connection;
determining an identity of a point of connection that is associated with the next connection point that is projected; and
setting the likely future point of connection to be the identity of the point of connection that is associated with the next connection point that is projected.

7. The method of claim 1, further comprising:
determining, by the processor, that the message consumer is currently connected to the messaging network; and
sending the message to a current connection point of the message consumer.

8. A system comprising:
a memory; and
a processor, operatively connected to the memory, to:
receive a message, associated with a group comprising a plurality of message consumers, wherein the message is to identify a message consumer among the plurality of message consumers in the group subscribed to a holding queue at a time in which the message consumer among the plurality of message consumers in the group is connected to a messaging network;
determine that the message consumer among the plurality of message consumers in the group is disconnected from the messaging network at a first time;
calculate a likely future point of connection to the messaging network at a second time for the message consumer among the plurality of message consumers in the group that is disconnected from the messaging network at the first time in view of a pattern of a plurality of points of connections of each of the plurality of message consumers associated with tracking information, wherein the second time occurs after the first time;
establish, by the processor, the holding queue proximal to the likely future point of connection, wherein the message is placed on the holding queue; and
send the message directly to the likely future point of connection before the message consumer reconnects to the messaging network at the second time.

9. The system of claim 8, wherein the processor is to:
track data associated with each of the plurality of message consumers in the group, wherein the data comprise one of a date of point of connection to the messaging network, a time of the point of connection to the messaging network, a duration of the connection to the messaging network or a mechanism for connection to the messaging network.

10. The system of claim 8, wherein to calculate the likely future point of connection, the processor is to:
access an identity of a point of connection among the plurality of points of connections to which the message consumer was previously connected; and
set the likely future point of connection to be the identity of the point of connection to which the message consumer was previously connected.

11. The system of claim 8, wherein to calculate the likely future point of connection, the processor is to:
access an itinerary of the message consumer;
access a current date;
determine a geographic location for the message consumer according to the itinerary and the current date;

determine an identity of a point of connection among the plurality of points of connections that is associated with the geographic location; and set the likely future point of connection to be the identity of the point of connection that is associated with the geographic location.

12. The system of claim 8, where the processor is further to:
    determine that the message consumer is currently connected to the messaging network; and
    send the message to a current connection point of the message consumer.

13. The system of claim 8, wherein the pattern is a geographical location pattern.

14. The system of claim 8, wherein to calculate the likely future point of connection, the processor is to:
    track the plurality of points of connection of each of the plurality of message consumers;
    project a next connection point for a message consumer among the plurality of message consumers in view of the pattern of the plurality of points of connection;
    determine an identity of a point of connection that is associated with the next connection point that is projected; and
    set the likely future point of connection to be the identity of the point of connection that is associated with the next connection point that is projected.

15. A non-transitory computer-readable medium comprising instructions to cause a processor to:
    receive a message associated with a group comprising a plurality of message consumers, wherein the message identifies a message consumer among the plurality of message consumers in the group subscribed to a holding queue at a time in which the message consumer among the plurality of message consumers in the group is connected to a messaging network;
    determine, by the processor, that the message consumer among the plurality of message consumers in the group is disconnected from the messaging network at a first time;
    calculate, by the processor, a likely future point of connection to the messaging network at a second time for the message consumer among the plurality of message consumers in the group that is disconnected from the messaging network at the first time in view of a pattern of a plurality of points of connections of each of the plurality of message consumers associated with tracking information, wherein the second time occurs after the first time;
    establish, by the processor, the holding queue proximal to the likely future point of connection, wherein the message is placed on the holding queue; and
    send, by the processor, the message directly to the likely future point of connection before the message consumer reconnects to the messaging network at the second time.

16. The non-transitory computer-readable medium of claim 15, wherein the pattern is a geographical location pattern.

17. The non-transitory computer-readable medium of claim 15, wherein the processor is to:
    track data associated with each of the plurality of message consumers in the group, wherein the data comprise one of a date of point of connection to the messaging network, a time of the point of connection to the messaging network, a duration of the connection to the messaging network or a mechanism for connection to the messaging network.

18. The non-transitory computer-readable medium of claim 15, wherein to calculate the likely future point of connection, the processor is to:
    access an identity of a point of connection among the plurality of points of connections to which the message consumer was previously connected; and
    set the likely future point of connection to be the identity of the point of connection to which the message consumer was previously connected.

19. The non-transitory computer-readable medium of claim 15, wherein to calculate the likely future point of connection, the processor is to:
    access an itinerary of the message consumer;
    access a current date;
    determine a geographic location for the message consumer according to the itinerary and the current date;
    determine an identity of a point of connection among the plurality of points of connections that is associated with the geographic location; and
    set the likely future point of connection to be the identity of the point of connection that is associated with the geographic location.

20. The non-transitory computer-readable medium of claim 15, wherein to calculate the likely future point of connection, the processor is to:
    track the plurality of points of connection of each of the plurality of message consumers;
    project a next connection point for a message consumer among the plurality of message consumers in view of the pattern of the plurality of points of connection;
    determine an identity of a point of connection that is associated with the next connection point that is projected; and
    set the likely future point of connection to be the identity of the point of connection that is associated with the next connection point that is projected.

* * * * *